Figure 1:
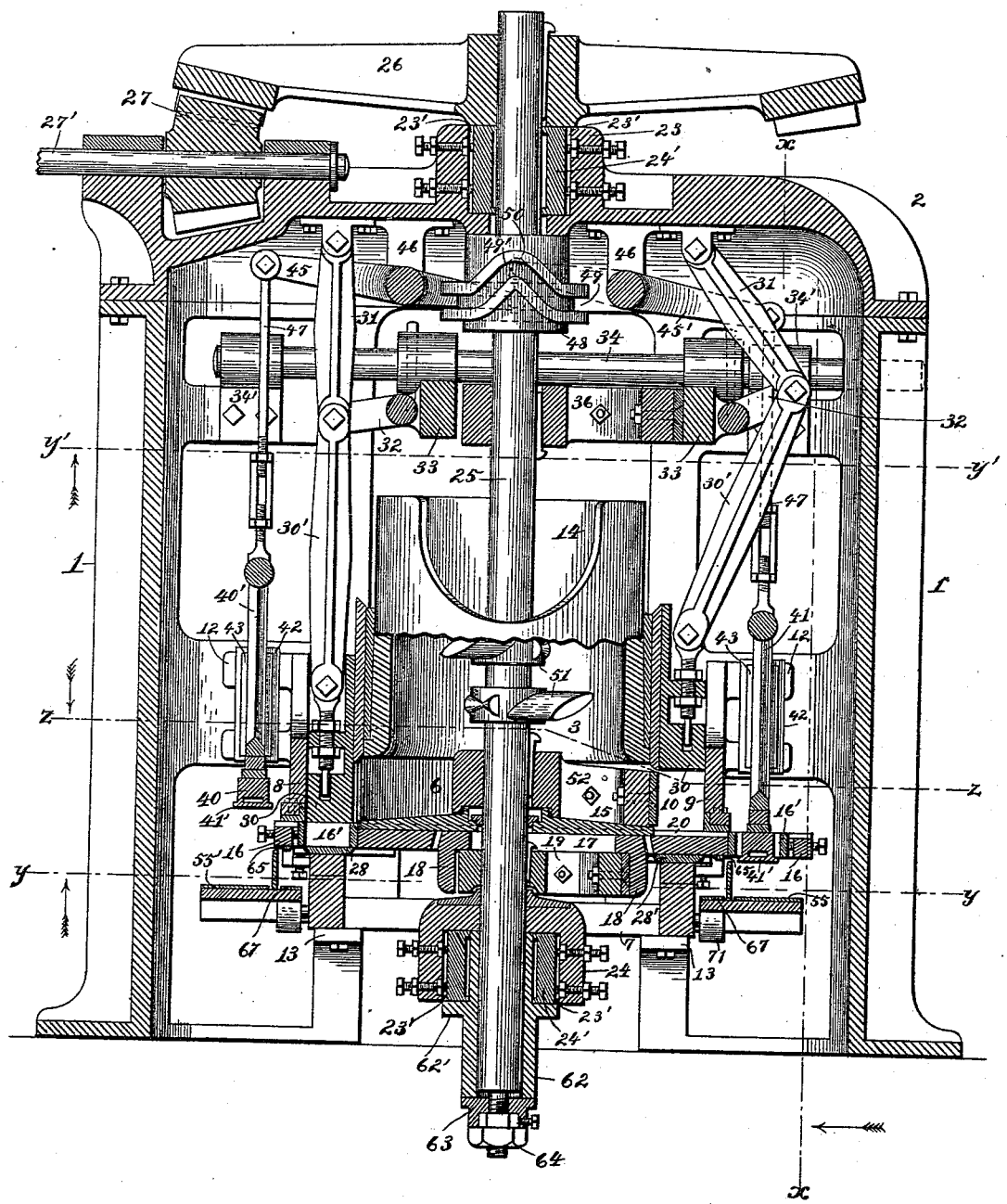

(No Model.) 7 Sheets—Sheet 1.

F. GRANT.
BRICK MACHINE.

No. 420,055. Patented Jan. 28, 1890.

WITNESSES:

INVENTOR
Frank Grant.
By Edochi Bros,
Attorney (No Model.) 7 Sheets—Sheet 2.
F. GRANT.
BRICK MACHINE.
No. 420,055. Patented Jan. 28, 1890.
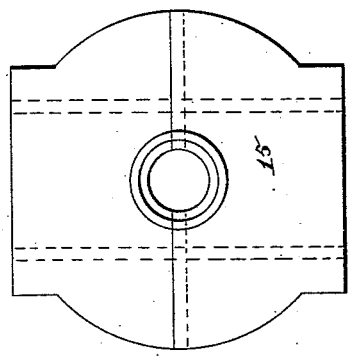
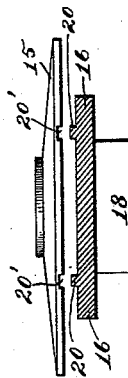
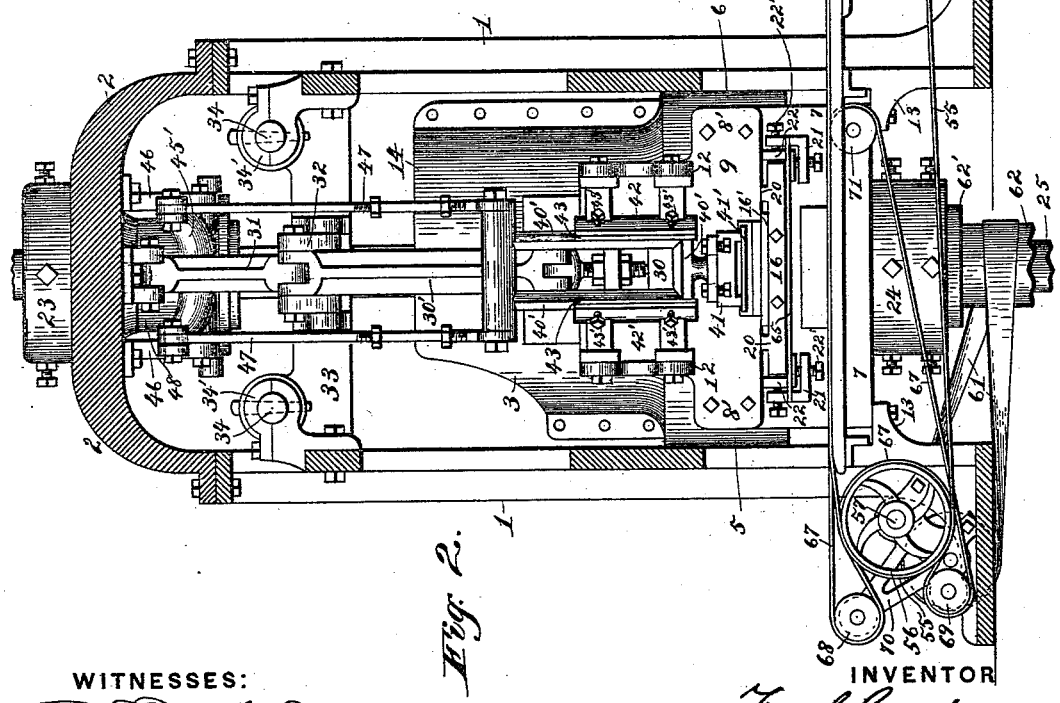
WITNESSES:
INVENTOR
Frank Grant.
By Edson Bro's.
Attorney (No Model.) 7 Sheets—Sheet 3.

F. GRANT.
BRICK MACHINE.

No. 420,055. Patented Jan. 28, 1890.

WITNESSES:

INVENTOR
Frank Grant.
By Edson Bros.
Attorney

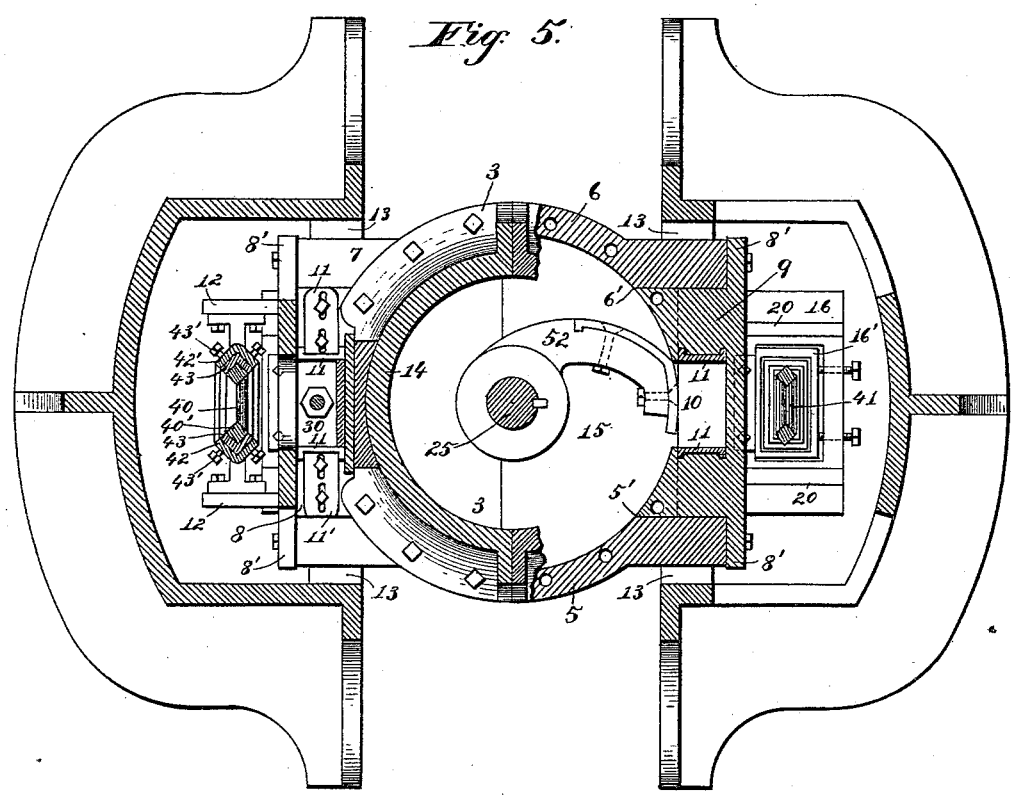

(No Model.) 7 Sheets—Sheet 5.

F. GRANT.
BRICK MACHINE.

No. 420,055. Patented Jan. 28, 1890.

WITNESSES:

INVENTOR
Frank Grant.
By Edson Bros,
Attorney (No Model.) 7 Sheets—Sheet 6.
F. GRANT.
BRICK MACHINE.

No. 420,055. Patented Jan. 28, 1890.

WITNESSES.
INVENTOR
Frank Grant
By Edson Bros,
Attorney (No Model.)   7 Sheets—Sheet 7.

F. GRANT.
BRICK MACHINE.

No. 420,055.  Patented Jan. 28, 1890.

WITNESSES:

INVENTOR
Frank Grant
By Edson Bros,
Attorney

UNITED STATES PATENT OFFICE.

FRANK GRANT, OF MIDDLEPORT, OHIO, ASSIGNOR OF ONE-HALF TO A. H. MURRAY, OF SAME PLACE.

BRICK-MACHINE.

SPECIFICATION forming part of Letters Patent No. 420,055, dated January 28, 1890.

Application filed March 30, 1889. Serial No. 305,418. (No model.)

*To all whom it may concern:*

Be it known that I, FRANK GRANT, a citizen of the United States, residing at Middleport, in the county of Meigs and State of Ohio, have invented certain new and useful Improvements in Brick-Machines; and I do hereby declare the following to be a full, clear, and exact description of the invention, such as will enable others skilled in the art to which it appertains to make and use the same.

My invention relates to improvements in that class of brick-machines known to the art as "reciprocating-plunger machines," an example of which is shown in a prior patent granted to me on October 24, 1876, and numbered 183,662.

In my present invention I aim to positively feed the necessary or desired quantity of clay to the molding devices, subject the clay to pressure to form a brick of a desired shape, eject the brick from the mold, and convey the same away from the machine, all of these operations being performed automatically by suitable mechanisms. I also contemplate removing any surplus material or "shavings" from the embryonic brick while it is still contained in the mold, and to discharge the shavings or scrap from the machine, to construct and arrange the various parts in a substantial and simple manner, and to compensate for wear between the various parts, so that they will move or run freely and steadily without lateral play, which is liable to injure them to such an extent that they become useless and require to be replaced. With these ends in view I provide a mill or hopper of peculiar construction, and having lateral openings in its lower end and at diametrically-opposite sides, through which the necessary or desired quantity of clay to form a brick is alternately forced by means of a sweep which is carried by a vertical power-shaft passing centrally through the hopper. Below the bottom of this mill or hopper I provide a horizontally-reciprocating mold-carrier, which is actuated by a cam on the vertical power-shaft, and which carries at or near its ends two molds which are adapted by the reciprocating movement of the carrier to alternately assume a position immediately beneath and in the vertical plane of the discharge-openings of the hopper to receive the charge of clay directly from said hopper. As each mold aligns with the discharge-opening of the hopper, a vertically-reciprocating plunger descends and acts upon the clay to compress the same between itself and a stationary plate on a fixed frame which supports the mold-carrier, after which the compression-plunger ascends and the mold-carrier is forced outwardly away from the hopper into a position where it is adapted to be acted upon by an expelling-plunger which descends and forces the pressed brick from the mold upon a primary conveying-apron. As the mold-carrier is reciprocated back and forth, one of the molds thereof is charged from the hopper and the clay in said mold is pressed while the other mold of the carrier is being acted upon by its expelling-plunger; but when the carrier is reversed the positions of the molds are changed, so that the last-mentioned mold is charged with clay and compressed while the brick in the first-mentioned mold is expelled by the expelling-plunger. The two compression-plungers are located on opposite sides of the hopper or mill and guided in ways or guides of novel construction, and to the upper ends of the rods of said compression-plungers are connected toggle-joints which are linked to a pair of endwise-movable rods arranged in a horizontal position in the upper part of the main frame, and they are supported and guided in suitable fixed bearings on said frame. These rods are connected by transverse bridge-pieces, against which alternately impinges a rotary cam carried by the vertical power-shaft, so as to reciprocate said rods back and forth in a straight horizontal line, and said rods are connected by independent toggle-joints to both compression-plungers for the purpose of alternately reciprocating said plungers vertically. The expelling-plungers are located laterally or to one side of the compression-plungers and are guided in stationary bearings fixed on the main frame. Said expelling-plungers are connected by intermediate rods with two independent levers, which are arranged in the upper part of the frame of the machine, above the endwise-movable rods that actuate the compression-plungers. These levers for moving the expelling-plungers are independently hung from or fulcrumed at an intermediate point of their length on a stationary cap of the main frame, and said independent levers are operated or moved alternately on their fulcrums to likewise reciprocate the expelling-plungers vertically by a single cam carried by the vertical power-shaft, and which is common to both levers. Below each mold of the carrier and in the vertical plane of the compression-plungers I provide a primary conveying-belt, which receives the pressed clay or brick after it has been forced from the mold by the expelling-plunger, and which conveys the brick away from the machine. The two primary belts pass at one end over large belt-pulleys, which are carried by a common shaft journaled in bearings in the lower part of the main frame and extending from side to side thereof, and this pulley-shaft is geared to a counter-shaft, which in turn is belted to a sleeve carried by the lower extremity of the vertical power-shaft. I also provide an auxiliary scrap-belt of smaller size, which is arranged at one side of the primary conveying-belt and immediately below a stationary knife or scraper, which is fixed below the mold-carrier in such a position that it will cut off any surplus material that may project below the stationary bottom plate of the mold. One of the auxiliary scrap-belts is arranged below each end of the mold-carrier, laterally of and between the primary conveying-belt and the horizontal frame on which said mold-carrier is supported, and each of these scrap-belts passes around a set of idle-pulleys and the large belt-pulleys on the apron-driving shaft, whereby the scrap-belts are caused to travel in a direction the reverse of the primary conveying-belts, and thus discharge the scrap at one side of the machine, while the bricks are conveyed to the opposite side.

My invention further contemplates the provision of means for taking up the wear between the several working parts of the machine and the peculiar construction and arrangements of parts, as will be hereinafter fully described and claimed.

To enable others to understand my invention, I will now proceed to describe the same in connection with the accompanying drawings, in which—

Figure 3:
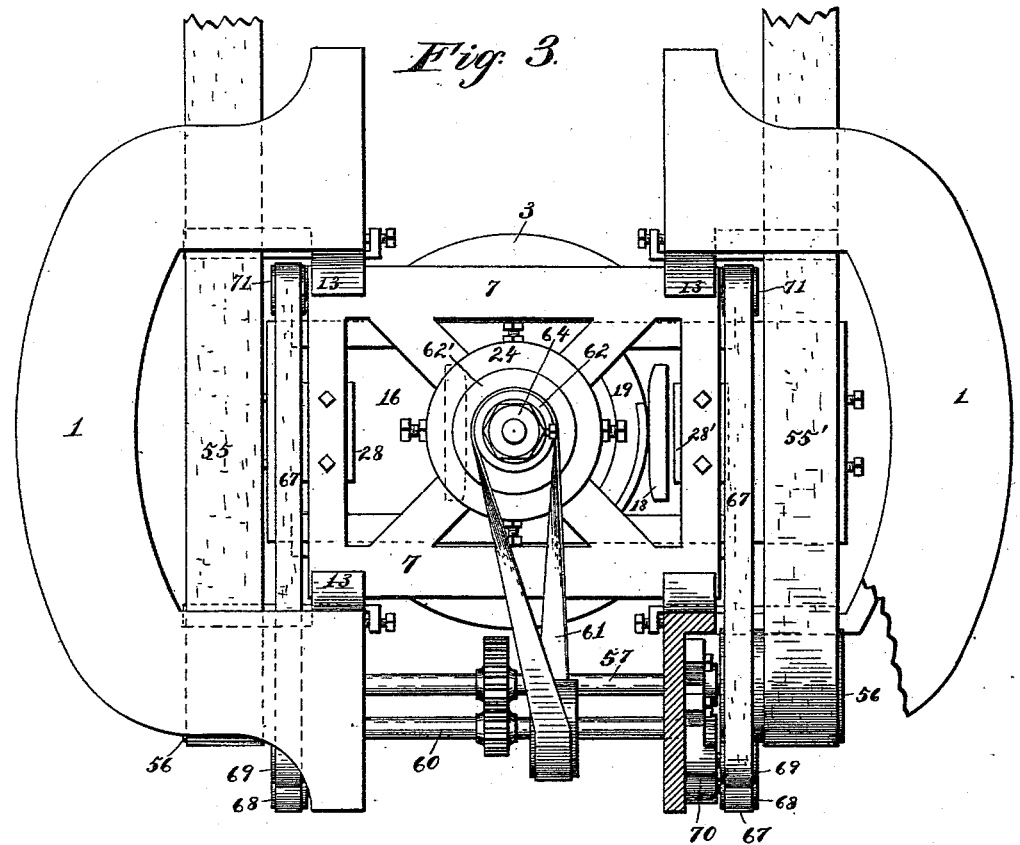
Figure 4:
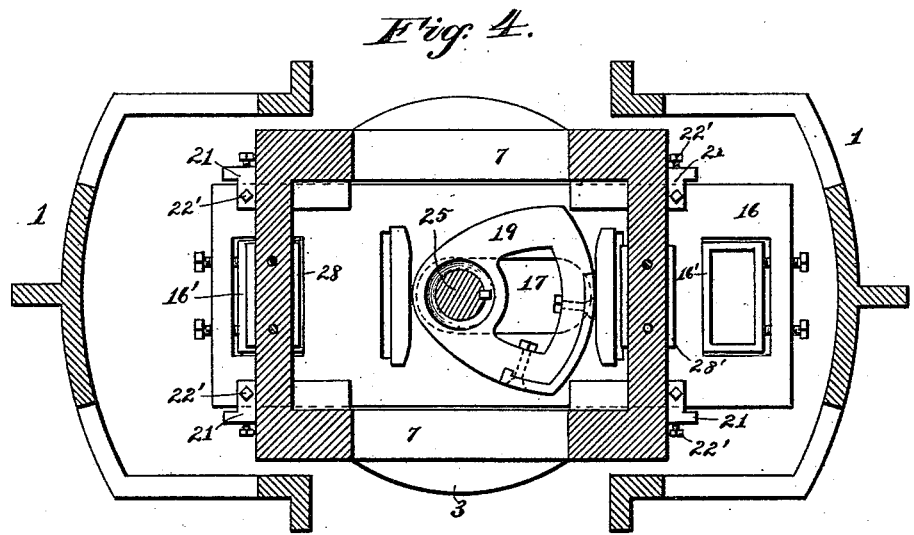
Figure 7:
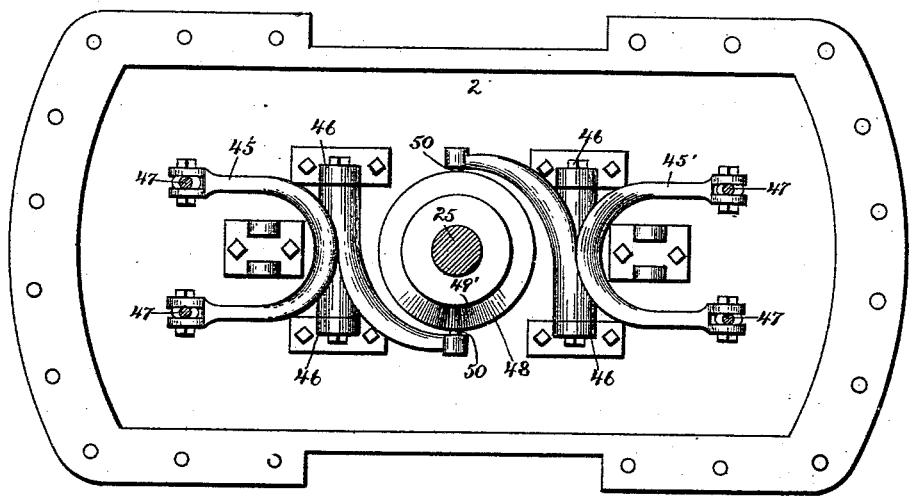
Figure 8:
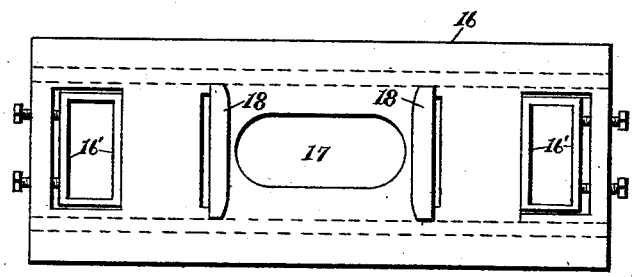
Figure 9:
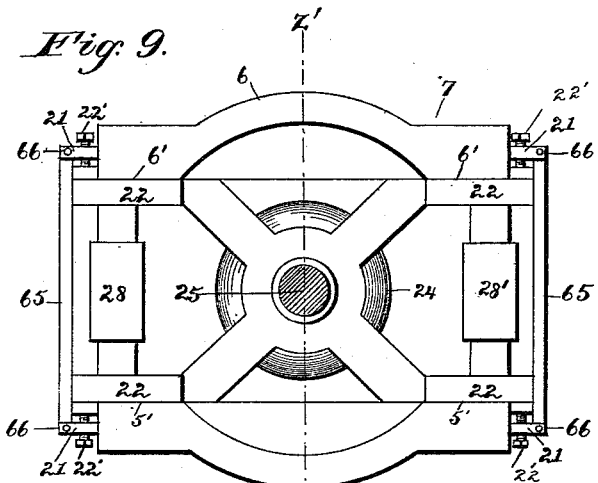
Figure 10:
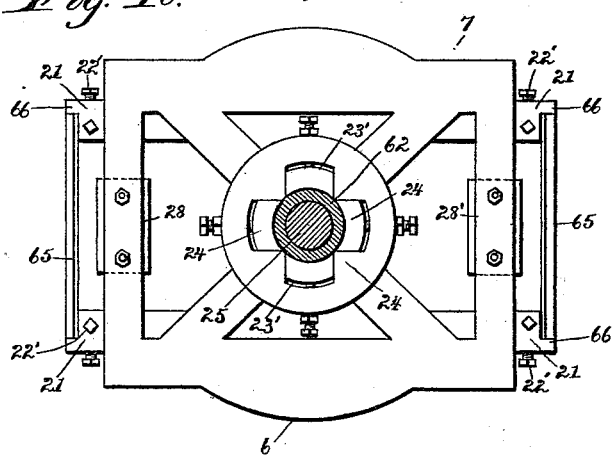
Figure 11:
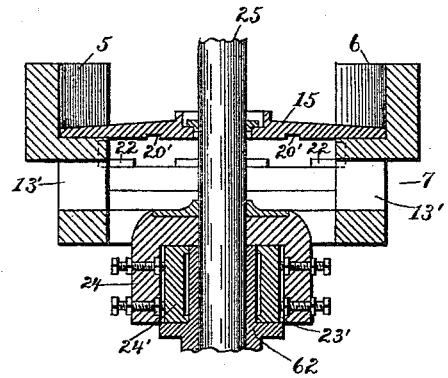
Figure 12:
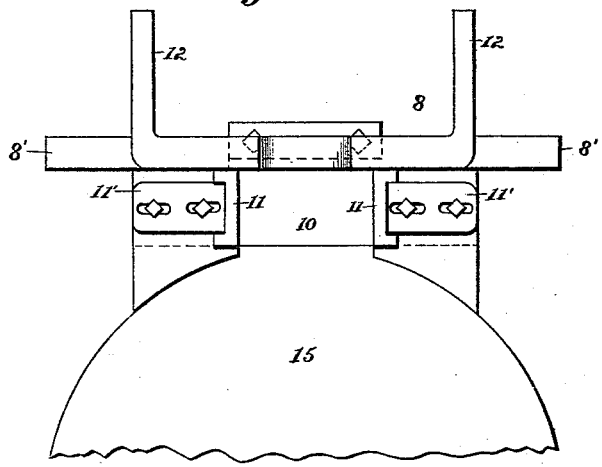
Figure 13:
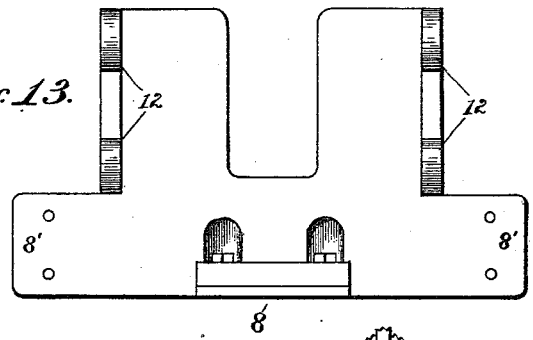
Figure 14:
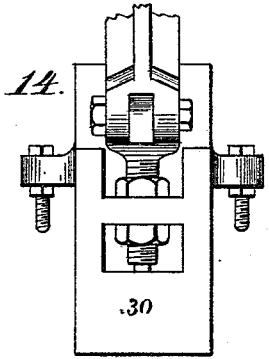
Figure 15:
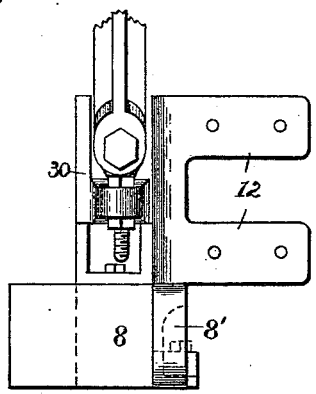

Figure 1 is a vertical central sectional view through a brick-machine constructed in accordance with my invention. Fig. 2 is a vertical sectional view on the plane indicated by the irregular line $x\ x$ of Fig. 1, looking in the direction indicated by the arrow at the bottom of Fig. 1. Fig. 3 is an inverted bottom plan view of my machine, showing a portion of one side of the main frame, partly in section. Fig. 4 is a horizontal sectional view on the plane indicated by the line $y\ y$ in Fig. 1, looking upward in the direction indicated by the arrow. Fig. 5 is a horizontal sectional view on the irregular plane indicated by the line Z Z, looking downward in the direction indicated by the arrow. Fig. 6 is a horizontal sectional view on the plane indicated by the letters $y'\ y'$ of Fig. 1, looking upward. Fig. 7 is a plan view of a portion of the machine, showing more particularly the two horizontal levers for alternately reciprocating the expelling-plungers and the single cam for moving said levers, the vertical driving-shaft being shown in cross-section. Fig. 8 is a detached detail view in plan of the horizontally-reciprocating mold-carrier. Fig. 9 is a top plan view of the lower horizontal frame for supporting the mold-carrier, detached from the machine; and Fig. 10 is a bottom plan view of the same part. Fig. 11 is a detail vertical sectional view on the plane indicated by the line $Z'\ Z'$ of Fig. 9. Figs. 12 and 13 are detail views, in plan and side elevation, respectively, of the guides for the compression and expelling plungers. Fig. 14 is an enlarged detail view of the lower portion of the compression-plunger. Fig. 15 is an end elevation of the guides shown in Figs. 12 and 13, with the compression-plunger fitted therein. Fig. 16 is a detached plan view of the bottom of the hopper; and Fig. 17 is a vertical sectional view, in outline, of a portion of the bottom of the hopper and the mold-carrier, showing the guide-grooves and ribs for insuring the proper reciprocating play of the mold-carrier.

Like numerals of reference denote corresponding parts in all the figures of the drawings.

In carrying my invention into practice I provide an upright stationary main frame 1 of any suitable construction, and provide said frame at its upper end with a horizontal cap 2, which is firmly bolted to the frame. Below this cap I provide a vertical mill or hopper 3, which receives the clay or material from which the bricks are made, and this hopper is constructed in a peculiar manner, which I will now proceed to describe.

The lower part of the hopper is formed by upwardly-extending walls 5 6, (see Figs. 11, 10, 9, and 5,) made integral with a horizontal stationary frame 7, that is fixed in the lower part or base of the main frame. These walls 5 6 are made segmental or curved, and they are located on opposite sides of said frame 7, the terminals of said segmental walls being extended outward at a tangent to the circle described by the interior face of the hopper, these extensions of the two walls on one side of the hopper being parallel with each other and designated by the numerals 5' 6'. (See Figs. 5, 9, and 10.) These segmental walls of the frame 7 constitute only a portion of the lower part of the hopper, as the opposite sides thereof are left open in the spaces between the parallel extensions 5' 6'; but these spaces are filled in by castings 8 9, one of which is arranged between each pair of the extensions 5' 6' and on one side of the hopper. These castings, which are shown in detail in Figs. 12, 13, and 15, also constitute or form the guides for the compression-plungers, as well as constituting a part of the lower end of the hopper. In cross-section the rear surface of the body of the casting is curved in the arc of a circle to conform to the curvature of the inner surface of the hopper or mill, so that when said casting is properly adjusted and secured between the extensions 5' 6' at one side of the hopper the curved surface of the body thereof forms a continuation of the corresponding surface of the segmental walls 5 6 of the hopper, thus completing the circle which constitutes the inner surface of the hopper or mill. At its base the casting is provided with laterally-extending ears or lugs 8', which bear against the edges of the extensions 5' 6' and are bolted thereto, as shown in Fig. 5, and vertically through the rear portion of the casting, just in front or to one side of the curved surface thereof, is provided a vertical passage or outlet-opening 10, through which passes the material or clay that is fed from the hopper to the mold, and in which passage reciprocates the compression-plunger, presently referred to. This passage 10 opens through the rear side of the casting, so as to communicate with the hopper, and through the upper and lower sides of the casting to permit the compression-plunger to pass through the same and act on the material or clay in the mold of the reciprocating mold-carrier. In the lateral sides or faces of this passage 10 are placed wear-plates 11, that are fitted in suitable recesses and are adjustable laterally by means of slotted feet 11', which are secured by bolts, as shown in Fig. 12.

The front side of each casting is provided with forwardly-extending arms or flanges 12, which are spaced a suitable distance laterally of each other and arranged parallel, as shown in Figs. 12 and 13, to which flanges are secured the guides for the expelling-plunger, as will be more fully described hereinafter.

Recurring to the description of the lower horizontal frame, that constitutes the major portion of the bottom of the hopper, I desire to call attention to Figs. 9, 10, and 11, from which it will be noted that in general outline the frame is rectangular, except at the sides where the walls 5 6 project beyond the marginal line of the frame. This frame rests on and is rigidly secured by bolts to flanges or shoulders 13 on the sides of the main frame, (see Figs. 1, 2, and 3,) and by reference to Figs. 1 and 11 it will be noted that this frame is contracted in width below the segmental walls 5 6, as at 13', in which works the cam for reciprocating the mold-carrier, as will be presently described.

The upper part of the hopper, which is designated by the numeral 14, is made of two semicircular parts, which are laterally united together and to the lower part or frame by suitable bolts, as is obvious, the upper part of the hopper formed by these semicircular parts being preferably of smaller diameter than the lower part of the hopper formed by the side walls 5 6 and the castings 8 9. The lower end of the hopper is closed by a horizontal bottom, (shown in detail in Fig. 16,) which is shaped to fit snugly between the side walls 5 6 of the hopper or frame below the lateral outlet-openings 10 in the castings 8 9, this bottom being preferably sloped slightly from its center toward the sides of the hopper and rigidly secured in place thereto.

It will be understood from the foregoing description, taken in connection with the drawings, that the hopper is made or composed of six several parts—namely, the lower horizontal frame having the side walls 5 6, the two castings 8 9, fitted laterally between said side walls, thus completing the lower part of the hopper and providing the lateral outlet-openings, the semicircular upper parts 14, which are bolted to each other and to the lower part of the hopper, and the bottom, the entire hopper being supported on the lower horizontal frame 7, which in turn is secured on the main frame 1.

Below the bottom of the hopper and in close juxtaposition thereto I provide the reciprocating mold-carrier 16. (Shown in detail in Fig. 8 of the drawings.) This mold-carrier consists of a flat horizontal plate, having at its ends vertical openings, in which are fitted the molds 16', secured in place by binding-screws, as shown. This carrier is provided at its longitudinal center with a slot 17, to permit the vertical power-shaft to pass through the carrier and adapt the latter to have the necessary endwise movement or play, and said carrier is further provided with vertical lugs or flanges 18, which are located at opposite ends of the longitudinal slot transversely across the carrier. Between these flanges is arranged a rotary cam 19, (see Fig. 4,) which is fixed to or carried by the power-shaft and adapted to alternately impinge or strike against said flanges, and thus reciprocate the carrier or move it endwise, so that the molds thereof are alternately adjusted in line with the openings 10 to receive the charge of clay from the hopper, and this carrier is further provided with longitudinal ribs 20, which are arranged parallel with each other and fitted snugly in guide-grooves 20', that are formed in the lower face of the stationary bottom 15 of the hopper to insure the proper movement of the carrier. This mold-carrier is arranged or fitted between the sides of the frame 7, and is supported by right-angled plates 21, Fig. 2, which are located at the angles or corners of the frame 7, two of these plates being arranged on each side of the frame to insure the proper support of the carrier, and between each of these angle-plates and the edge or side of the mold-carrier is interposed a wear-plate 22, which conforms in shape to the angle-plate and the edge of the carrier, so that said parts are snugly fitted together. These wear-plates can be adjusted, either laterally or vertically with relation to the carrier, to take up and compensate for wear on either of the faces of the carrier or the wear-plates, by means of adjusting-screws 22', which are fitted in suitable threaded apertures in the supporting angle-plates 21.

The cap 2 and the lower horizontal frame 7 of the machine are provided at their vertical centers with aligned bearings 23 24, respectively, each bearing being made integral with its respective part. Said bearings are each provided with radial recesses or grooves 23' at diametrical points outside of the vertical central aperture therein, and in these recesses are fitted wear-plates 24', that can be adjusted or moved radially in the recesses independently of the other wear-plates by means of regulating-screws, as shown in Figs. 1 and 11, so that the wear between the adjusting-blocks and the vertical power-shaft can be readily taken up and the shaft expeditiously centered in the bearings. Passing centrally through the mill or hopper and the bottom thereof, and also through the aligned bearings 23 24 at the vertical center of the main frame, is a vertical power-shaft 25, which runs the entire length of the frame 1, and extends or projects at its ends beyond the bearings 23 24, provided for its support. To the extreme upper end of this vertical power-shaft, at a point above the fixed cap 2 of the machine, I secure thereto a bevel master-gear 26, with which meshes a smaller driving-pinion 27, that is secured on a shaft 27', driven by a suitable motor or engine for imparting motion to the vertical power-shaft and from the latter to the several operating mechanisms of my brick-machine.

In the longitudinal center of the lower supporting-frame 7, I provide two fixed platens or plates 28 28', which are located at the ends of the frame 7 and below the horizontally-reciprocating mold-carrier, in such position that when one of the molds aligns with one of the passages 10 of the hopper one of said platens lies immediately beneath the mold and closes the lower side or bottom thereof, the clay being pressed between the platen and the compression-plunger 30. There are two of these compression-plungers provided, which are located on opposite sides of the hopper or mill, and are fitted, respectively, in each of the passages 10, between the adjustable wear-plates 11 therein. Each compression-plunger is limited to movement in a vertical plane and guided between the wear-plates 11, and said plungers are alternately reciprocated, so that when one is depressed to enter one of the molds of the mold-carrier the other is elevated to withdraw it from its mold at the opposite end of the carrier. To each of these compression-plungers are connected the lower extremities of a pair of links 30', (see Figs. 1, 6, and 7,) and these links 30' are in turn connected to another pair of links 31, the upper extremities of which are jointed or pivoted to the fixed cap 2 of the main frame. There are four pairs of these links provided, two pairs for each compression-plunger, and these two pairs of links for each plunger are jointed to form a toggle-joint, which is linked, as at 32, to one of a pair of transverse bars 33, which connect a pair of endwise-movable rods 34. These rods are arranged in horizontal parallel positions in the upper part of the main frame 1 and are supported and guided in fixed bearings 34'. The transverse bars 33 are spaced at suitable intervals on the endwise-movable rods and are suitably secured thereto, and between these transverse bars operates a rotary cam 36, which is fixed or secured on the vertical power-shaft 25 to rotate therewith. It is obvious that when this cam impinges against one of the transverse bars 33 the rods will be moved endwise in one direction to draw up one of the compression-plungers and lower the other corresponding plunger, and that when the cam impinges against the other transverse bar the pair of rods are moved endwise in the reverse direction to move said compression-plungers vertically in the opposite direction from that in which they were first operated.

Laterally or to one side of each compression-plunger is arranged an expelling-plunger, two of which are provided, as shown at 40 41. Each compression-plunger consists of a rectangular frame 40', composed of vertical side and horizontal end bars, which are suitably united or cast, and a shoe 41', which depends from the frame and is rigidly secured thereto. The side bars of the frame 40' are arranged with the sharp angles or corners standing with their faces in proximity to the vertical guides 42 42', and these guides are arranged in vertical upright positions, at suitable intervals apart, between the vertical flanges 12 of the casting 8 or 9. The guides are made of right-angled plates of metal, or V-shaped in cross-section, to adapt them to snugly fit over the angles of the side bars of the plunger-frame, and thus prevent the latter from having any lateral or side play, and between each guide and each side bar of the plunger-frame is interposed an angular wear-plate 43, which can be adjusted laterally either to the right or left by regulating-screws 43', that work in the stationary guides which are bolted to the flanges 12 of the casting 8 or 9. The mechanism for moving these expelling-plungers vertically in opposite directions at the same time consists of two horizontal levers 45 45', which are arranged in the upper part of the main frame 1 below the cap 2 thereof and above the endwise-movable rods 34. These levers are independently hung or fulcrumed on depending arms 46, that are made integral with or secured to the cap 2, and one end of each lever is bifurcated, as shown in Fig. 7, and connected to a pair of vertical depending rods 47, the lower ends of which are pivotally connected to the frame of the expelling-plunger, as is obvious. The opposite or free end of each lever is curved laterally, the end of one lever being curved laterally to one side of the vertical power-shaft, while the corresponding end of the other lever is curved laterally in the opposite direction, so as to lie on the other side of said shaft. The levers are operated by a single cam-wheel 48, which is common to both levers and is fixed or secured on the vertical shaft, and in the periphery of said cam-wheel is formed an annular peripheral groove 49, which has a single cam-surface 49'. At diametrically-opposite points in the peripheral groove of the cam-wheel are fitted two friction-rollers 50, which are attached to the free ends of the levers 45 45', whereby when the cam rotates these friction-rollers alternately ride in the annular and cam surfaces of the groove in the cam-wheel and oscillate the levers on their fulcrums to reciprocate expelling-plungers vertically in opposite directions.

It will be understood that when the mold-carrier is moved laterally away from one passage 10 of the hopper the compression-plunger for the charged mold is raised away from that mold, and when this mold arrives beneath the expelling-plunger the latter is depressed, so as to enter the mold and expel the brick therefrom, this operation being true of the compression and expelling plungers of both molds on the mold-carrier.

In order to properly mix and feed the clay in the mill, I have provided stirring-arms 51 on the vertical power-shaft 25 at a suitable point in the hopper above the bottom thereof, and these arms are so arranged that they force the clay downward into the path of a sweep 52, which is also carried by the vertical power-shaft, but at a point below the stirring-arms 51. This sweep consists of a single arm, which is curved longitudinally, so as to closely fit against the inner surface of the hopper, as shown clearly in Fig. 5 of the drawings, and it is obvious that any material in its path will be forced radially out of the hopper when the sweep approaches the lateral outlet opening or passage 10 of the hopper.

To convey the bricks from the machine after they have been formed in the molds and ejected therefrom by the expelling-plunger, I have provided two conveying-aprons 55 55', which are located on opposite sides of the machine and in the vertical plane of the expelling-plungers thereof. One end of each primary conveying-apron passes over the pulley 56, which is fixed to one end of a shaft 57, journaled in suitable bearings in the base of the main frame 1, and this apron is extended a considerable distance beyond one side of the machine and supported at its outer end over an idle-pulley 58, a rigid platform or table 59 being arranged immediately beneath the upper side of each endless primary apron to prevent the latter from swagging at its middle under the weight of the bricks thereon. The belt-shaft 57 is geared by intermediate gear-wheels (shown in Fig. 3) to a counter-shaft 60, which is arranged at one side of and parallel with the belt-shaft 57, and this counter-shaft is positively driven by motion from the vertical power-shaft through an intermediate belt 61, which passes over a pulley on the counter-shaft, and a sleeve 62, which sleeve is fitted on the lower extremity of the vertical power-shaft. This sleeve is extended at its upper end between the shaft and the lower bearing 24 thereof, and has an annular flange or collar 62', which impinges against the lower side of said bearing 24. The sleeve rotates with the vertical power-shaft, and against its lower end bears a nut or washer 63, which is secured to the shaft by means of a vertical screw or tap 64, whereby vertical play or movement of the power-shaft in its bearings is prevented by providing the sleeve having the annular flange and the nut or washer, as is obvious.

In order to remove any surplus material from the mold that may extend or project below the lower surface thereof when the mold-carrier is moved laterally to adjust one or the other charged mold thereof in position beneath the proper expelling-plunger, I have provided a knife or clearer 65 at each end of the lower horizontal frame 7. This knife is a thin piece of metal having its beveled cutting-edge facing toward the center of the machine, and it is arranged transversely across one end of the frame 7, the ends of said knife being fitted in notches in a pair of lugs 66 on one end of the frame 7 and secured in place on the frame 7 by pins or screws, as indicated in Figs. 9 and 10. By reference to Fig. 1 it will be noted that the knives are arranged across the mold-carrier, close against the lower side or face thereof, and when the mold with its charge of clay or the pressed brick is moved laterally away from the hopper and compression-plunger over the stationary knife the latter serves to cut or sever any surplus material that may project below the lower face of the mold. The scrap or shaving falls on an auxiliary scrap-apron 67, which is arranged immediately below the knife and laterally of the primary conveying-apron, in the same horizontal plane as the latter and between it and the lower horizontal frame 7. These auxiliary scrap belts or aprons are driven by the large belt-pulleys of the primary conveying-aprons; but in order to move the scrap-aprons in an opposite direction to that pursued by the conveying-aprons, and thus deposit the scrap at the opposite side of the machine from the formed bricks, I have arranged the scrap-aprons over small idle-rolls 68 69, which are suitably journaled at points above and below the large belt-pulleys, at one side thereof, in an angular frame 70 on the side of the main frame 1. The opposite end of the scrap-apron is supported by a small idle-roll 71, arranged within the main frame 1 and suitably journaled thereon, and by reference to Fig. 2 it will be seen that this scrap-apron passes first around the upper idle-roll 68, then around the large belt-pulley, thence to the lower idle-roll, and finally to and around the distant idle-roll 71.

The operation of my invention is as follows: The clay is fed to the hopper by an attendant or a suitable mechanical conveyer, and the agitator-arms on the vertical shaft 25 properly mix the clay and feed it downward in the path of the rotary sweep-arm. As this arm approaches one of the lateral outlet-openings 10 on one side of the hopper, the clay in a proper quantity is forced through said opening into the proper mold, which is so timed as to align with said opening 10 when the sweep-arm approaches the opening. As the material is deposited in the mold, the proper compression-plunger descends to compress the clay therein between itself and the stationary platen on the frame 7. The cam of the mold-carrier now forces the carrier laterally, so as to move the charged mold away from the hopper and the empty mold at the opposite end of the carrier in line with the other outlet opening or passage 10 before the sweep-arm passes said latter opening or passage. As the charged mold moves laterally away from the hopper, it passes over one of the stationary knives, which severs any surplus material and causes it to drop on the scrap-apron beneath the knife, and by which the scrap is conveyed to one side of the machine. As the charged mold arrives beneath the expelling-plunger, the latter descends and passes through the mold to force the brick therefrom upon the proper primary conveying-apron, which takes it to the opposite side of the machine from the side on which the scrap is deposited. While the expelling-plunger of one mold is operating, the compression-plunger of the other mold just charged is compressing the clay therein to the desired shape, the several cams being so arranged and proportioned that the compression-plunger of one mold and the expelling-plunger of the other are simultaneously lowered to act on their respective molds, the two plungers of each mold thereby moving in opposite vertical directions simultaneously. Two bricks are thus formed, trimmed, and expelled at each complete reciprocating motion of the mold-carrier, and the bricks and scrap or shavings are continuously discharged on opposite sides of the machine.

I would have it understood that I do not confine myself to the exact details of construction and form and proportion of parts of the mechanisms herein shown and described as an embodiment of my invention, but hold myself at liberty to make such changes and alterations therein as fairly fall within the scope of my invention.

Having thus fully described my invention, what I claim as new, and desire to secure by Letters Patent, is—

1. In a brick-machine, the combination of a hopper, a stationary frame on which the hopper is supported and having a fixed knife, a mold-carrier supported by the frame above the plane of the knife, a vertical power-shaft, the compression and expelling plungers, a shaft 57, driven from the power-shaft, and a scrap-apron arranged immediately below the fixed knife and adapted to be driven by said shaft 57, arranged and combined substantially as and for the purpose described.

2. In a brick-machine, the combination, with a hopper, the compression and expelling plungers, and a reciprocating mold-carrier, of a primary conveying-apron arranged below the carrier and in the vertical plane of the expelling-plunger, a shaft for driving said primary apron, a knife located below said carrier in close juxtaposition to the lower side thereof, and a scrap-apron located laterally of the primary apron below the knife and arranged to be driven by the shaft for the primary apron, substantially as described.

3. In a brick-machine, the combination, with a hopper, compression and expelling plungers, a vertical power-shaft, and a mold-carrier, of a primary conveying-apron, a shaft belted to the power-shaft for moving said apron, a knife, a scrap-apron located below the knife and arranged to be moved by the shaft for moving the primary belt, and the idle-rolls arranged above and below said apron-shaft and having the scrap-apron passed over the same, substantially as described.

4. In a brick-machine, the combination, with a hopper, compression and expelling plungers, a vertical power-shaft, and a mold-carrier, of a primary conveying-apron, a shaft for driving the latter, a sleeve fitted on the power-shaft at its lower end to rotate therewith, a counter-shaft belted to said sleeve and geared to the apron-driving shaft, a scrap-apron arranged below a clearing device and passing around the shaft for driving the primary apron, and the idle-rolls around which the scrap-apron passes, substantially as and for the purpose described.

5. In a brick-machine, a lower horizontal frame having the upright integral walls forming a part of the hopper, the castings fitted between the terminals of said walls at diametrically-opposite sides of the hopper, thereby to complete the lower part thereof, and the two-part upper member of the hopper fixed to the walls of said frame, as and for the purpose described.

6. In a brick-machine, a lower horizontal frame having the upright segmental walls forming a part of the hopper, and the castings fitted between the terminals of the walls, constructed to form a continuation of the inner surface of the hopper and having the lateral outlet-passages, in combination with a mold-carrier arranged below the hopper and the compression-plungers working in the vertical passages of the castings, substantially as and for the purpose described.

7. In a brick-machine, a hopper, the castings fixed laterally thereto and having the vertical passage constituting the lateral outlet for the hopper, and the vertical guides fixed to the casting beyond the vertical passage, in combination with the compression-plunger fitted in the vertical passage of the casting, an expelling-plunger arranged between the vertical fixed guides, and a horizontal reciprocating mold-carrier, substantially as described.

8. In a brick-machine, a hopper, a casting fixed laterally thereto and having the parallel flanges 12, the vertical angular guides fixed to said flanges, and the adjustable wear-plates fitted against the lateral opposing faces of the guides, in combination with a compression-plunger, an expelling-plunger arranged between said angular guides, and a reciprocating mold-carrier, substantially as described.

9. In a brick-machine, the combination, with a hopper having the lateral outlet-openings at diametrically-opposite sides and a mold-carrier, of two vertically-reciprocating compression-plungers fitted in said openings of the hopper, a pair of horizontal rods supported and guided above the hopper in the main frame and having the bridge-pieces, a power-shaft carrying a cam arranged between the bridge-pieces, and the toggle-joints independently linked to the bridge-pieces and connected to said compression-plungers, substantially as described.

10. In a brick-machine, the combination, with a hopper having the outlets, the compression-plungers, and a mold-carrier, of the independent expelling-plungers located on opposite sides of the hopper, a power-shaft, a single grooved cam fixed to the power-shaft above the hopper and having a single cam-surface in the groove thereof, and the independent levers 45 45', each fulcrumed at an intermediate point of its length and connected at its outer end with one of the expelling-plungers, the inner ends of said levers being bent in opposite directions laterally of the cam to lie on opposite sides thereof, and having friction-rollers which are fitted in the groove in said cam, whereby the rotary cam having a single cam-surface is adapted to operate said levers alternately, substantially as and for the purpose described.

11. In a brick-machine, a lower horizontal frame supporting the hopper, a reciprocating mold-carrier fitted in said frame, and the independent knives arranged transversely across the frame, detachably connected thereto, and fitted close to the lower side of the mold-carrier, in combination with the compression and expelling plungers, the primary conveying-aprons, and the independent scrap-aprons, substantially as and for the purpose described.

12. In a brick-machine, a main frame, a lower horizontal supporting-frame fixed thereto for supporting the hopper and having a central bearing, a cap fixed to the upper part of the frame, and likewise having a central bearing which is arranged in line with the bearing of the lower frame, and a vertical power-shaft journaled in said bearings, each bearing having radial slots, in which are fitted movable blocks adapted to be adjusted laterally of the shaft by regulating-screws, substantially as described.

In testimony whereof I affix my signature in presence of two witnesses.

FRANK GRANT.

Witnesses:
ARTHUR L. BRYANT,
H. I. BERNHARD.